Figure 1:
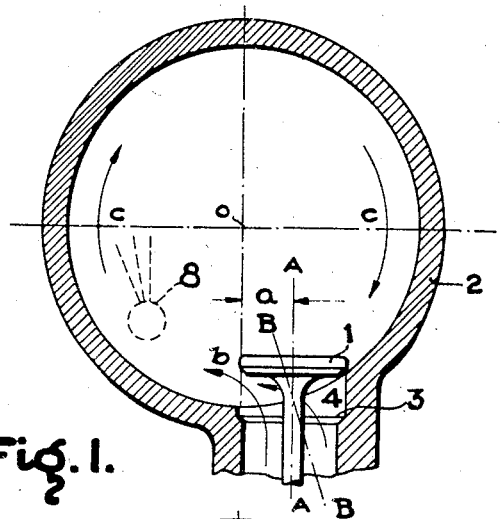

Feb. 14, 1933.  R. W. BAILEY  1,897,293
INTERNAL COMBUSTION ENGINE
Filed Dec. 15, 1928  2 Sheets-Sheet 1

WITNESS
E. Lutz

INVENTOR
R. W. Bailey.
BY
A. B. Reavis
ATTORNEY

Feb. 14, 1933.    R. W. BAILEY    1,897,293
INTERNAL COMBUSTION ENGINE
Filed Dec. 15, 1928    2 Sheets-Sheet 2

WITNESS
E. Lutz

INVENTOR
R. W. Bailey.
BY
A. B. Reavis
ATTORNEY

Patented Feb. 14, 1933

1,897,293

UNITED STATES PATENT OFFICE

RICHARD WILLIAM BAILEY, OF ALTRINCHAM, ENGLAND, ASSIGNOR, BY MESNE ASSIGNMENTS, TO ASSOCIATED ELECTRICAL INDUSTRIES, LTD., OF ENGLAND

INTERNAL COMBUSTION ENGINE

Application filed December 15, 1928, Serial No. 326,363, and in Great Britain December 28, 1927.

The invention primarily concerns the inlet valves of internal combustion engines operating with liquid or other fuel injection, and while capable of more general application, is particularly adapted for the improvement of the combustion components of power plant of the kind in which an internal combustion engine supplies gaseous products of combustion as motive fluid for use in a separate prime mover component, for example, as described in the specification of British Letters Patent Nos. 232,278, 244,215 and 245,541.

The main object of the invention is the attainment in a simple manner of an intimate and uniform mixture of the gaseous charge, hereinafter referred to as "air", with the fuel injected, hereinafter referred to for brevity as "liquid fuel", particularly with "solid" or "airless" injection, by imparting to said air charge a whirling or rotary motion within the cylinder.

This is effected according to the invention, by arranging an air inlet valve of the mushroom type in the side wall of the combustion space of the cylinder, which side wall is a surface of revolution, or substantially so, the axis of said valve (i. e. the center line along which it moves in opening and closing) being somewhat inclined to the normal or perpendicular to the surface of revolution at the point where this surface, if uninterrupted, would be penetrated by said axis, and in such manner that the valve axis, if extended, would not intersect the longitudinal axis of the combustion space. In other words, the valve axis is at a small angle to a radial plane at the point where the valve axis intersects the cylinder. The preferred amount of offset which the valve axis has with respect to the axis of the combustion space may vary according to the design, but may advantageously be of the order of the radius of the valve head. The valve and valve seat may be in other respects as nearly as possible of usual form.

By this simple expedient it follows that upon the valve opening inwardly of the cylinder, the cylinder wall screens or masks the valve on one side but not upon the other so that the incoming charge passes into the cylinder mainly or entirely towards one side of the valve and is thereby directed substantially tangentially over the cylinder wall. A violent whirl or vortex is thus produced within the cylinder.

The valve may be arranged to open so that it is always screened on one side by the cylinder wall or it may be opened to such an extent as to project just level with or beyond the interior surface of the cylinder wall at one side when fully open. In such cases the valve seat will be formed in a pocket or slight recess in the wall of the cylinder, the side of said pocket or recess being shaped if desired so as to assist the tangential flow of the charge. The pocket may, for example, be shaped so that when the valve is open the charge may flow into the cylinder around both sides of the valve, one portion flowing beneath the valve head on one side and entering tangentially into the cylinder and another portion flowing around the valve head on the other side and being deflected by the walls of the said pocket across the top of the valve head so as also to enter the cylinder more or less tangentially.

In another form according to the invention the valve is arranged to direct the air charge somewhat downwardly or helically away from the cylinder head, for example, by disposing the valve axis more or less inclined to a plane perpendicular to the cylinder axis, whereby the valve opening is a maximum somewhat to one side and away from the cylinder head. A similar effect may be obtained by shaping the upper portions of the side wall of the cylinder around the combustion space, for example, somewhat conically, and appropriately arranging the valve wholly or partly in such shaped portion of the wall.

A plurality of inlet valves may be provided in a cylinder wall according to a further feature of the invention in such manner as mutually to assist in the formation of the whirl in the cylinder. Moreover a cylinder may be provided having one or more inlet valves arranged as above stated and an exhaust valve disposed centrally in the cylinder head.

Figure 3:
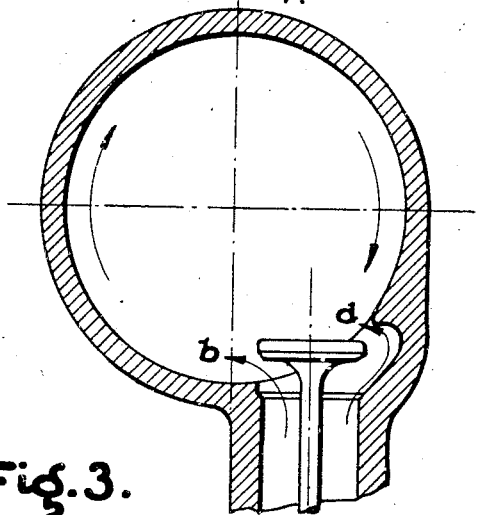
Figure 4:
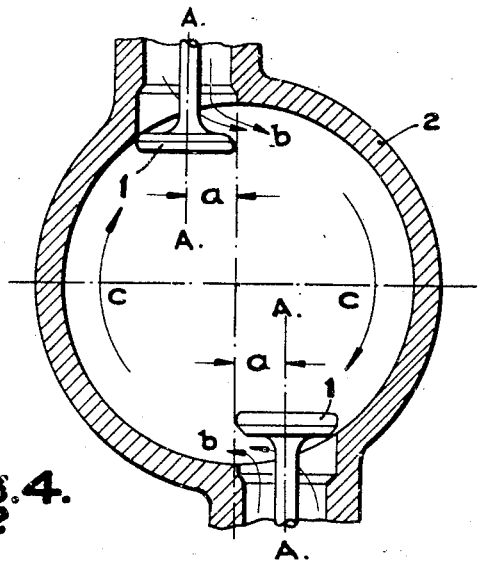
Figure 5:
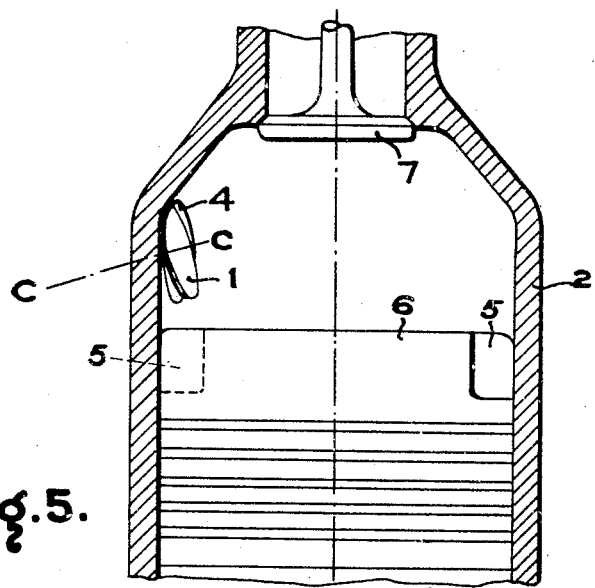
Figure 6:
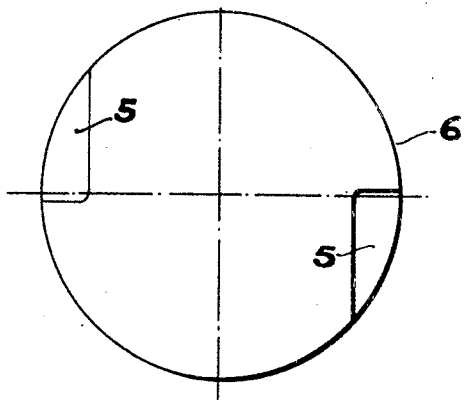

The invention will be more readily understood from the following description with reference to the accompanying drawings illustrating various constructions according to the invention, and wherein Figs. 1 to 4 represent cross sections of cylinder combustion spaces taken on planes perpendicular to the longitudinal axes thereof, Fig. 5 shows a section of a further modified form of cylinder on a plane containing the longitudinal axis thereof, and Fig. 6 is a plan of the piston indicated in Fig. 5. Corresponding parts are indicated by similar figures or letters of reference in all the views, and in Figs. 1 to 4 the valves are shown in their normal open position.

As is apparent from the drawings, a mushroom type inlet valve 1 of usual form is disposed in the side wall 2 of the cylinder in such a manner that the valve axis A—A is inclined to the normal or perpendicular B—B to the inner surface of the cylinder wall at the point where this surface, if uninterrupted, would be penetrated by said axis. The valve axis A—A when projected does not intersect the center O of the cylinder, but is offset a distance $a$ therefrom. With this arrangement the valve seat 3 is formed in a pocket or recess 4 in the wall 2 of the cylinder.

It will readily be observed that on the opening of the valve 1 as shown, the cylinder wall screens or masks the valve on one side but not on the other so that the charge passes into the cylinder mainly towards one side of the valve, and is thereby directed substantially tangentially over the cylinder wall as indicated by arrows $b$. A whirl or vortex is thus produced in the cylinder in the direction of arrows $c$, the formation of said vortex being assisted by the head of the valve projecting into the cylinder, whereby part of the whirling gas striking said head is deflected within the cylinder and the entrance of further air is assisted by induction.

Figure 2:
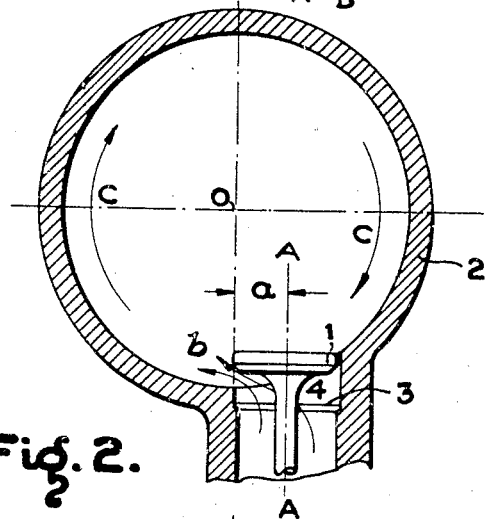

The depth of the recess 4 and the extent to which the value head projects within the cylinder may vary according to the preferred design. The valve when fully open may project as shown in Fig. 1, just beyond the interior surface of the cylinder wall at the side which is screened, or it may be arranged to open less, as shown in Fig. 2, so that one side is always well screened by the cylinder wall.

Fig. 3 shows a construction in which the side of the recess 4 is shaped to assist the tangential flow of the charge. With a form of recess such as shown, when the valve is open the charge flows around opposite sides of the valve, one portion flowing beneath the valve as indicated by arrow $b$ and entering tangentially into the cylinder, while another portion flows around the valve head on the other side as indicated by arrow $d$, is deflected by the wall of the recess and directed across the top of the valve so as also to enter the cylinder more or less tangentially.

Fig. 4 illustrates how a plurality of inlet valve 1, 1 may be provided in accordance with the principles above set forth and arranged so as mutually to assist the formation of the whirl indicated by arrows $c$. Obviously more than two valves may be provided if desired, spaced equally or unequally around the cylinder walls and in the same or different planes perpendicular to the axis of the cylinder, as may be preferred according to the circumstances in any particular case.

It is not essential for the inlet valve axis to lie in a plane perpendicular to the axis of the cylinder. In some cases the valve axis may advantageously be inclined to the inner surface of the side wall of the combustion space, for example as indicated by line C—C in Fig. 5. Such an arrangement may serve to direct the air charge somewhat downwardly or helically away from the cylinder head since the valve opening will be a maximum somewhat to one side and away from the cylinder head. In other words, the valve is arranged to impart to the air admitted a motion having a component in the direction of the cylinder axis. For this purpose instead of or in addition to inclining the valve axis, the cylinder walls around the combustion space may be shaped, for example, conically formed as shown in Fig. 5, the valve 1 being disposed wholly or partly in such shaped portion. This latter construction affords the further advantage that due to the reduction in the mean diameter of the combustion space upon the upward (compression) stroke of the piston and immediately before ignition occurs, the velocity of the whirling charge will tend to increase, by virtue of the angular momentum thereof.

In cases where the top of the piston partially covers the recesses containing the inlet valves when the piston is at the top of its stroke, it may be desirable to provide recesses 5 in the piston 6 as indicated in Figs. 5 and 6 in order to prevent the possibility of the piston fouling the valve or valves should the latter fail to close at the proper times. In power plant of the kind described in the specifications above referred to, however, such recesses may usually be safely dispensed with since the compression space is sufficiently large to accommodate the valve in the cylinder wall wholly above the top of the piston at the upper end of its stroke.

The arrangement of the inlet valve in accordance with the foregoing will also be applicable to engines having two pistons working opposed. In the case of a single acting engine however, the invention furthermore provides, as illustrated by Fig. 5, an improved combustion cylinder wherein the inlet valve or valves is or are arranged substantially as above described and an exhaust valve 7 is disposed centrally in the cylinder head. Such a cylinder construction is particularly advantageous in power plant of the kind above referred to wherein a large exhaust valve for the delivery of the combustion products with the least possible loss of efficiency is highly desirable.

It is evident that by the measures above proposed a whirling of the gases admitted to the combustion space may be effected in a simple manner, whereby intimate mixture with the fuel injected is assured. The fuel valve may be disposed in any convenient position but it is preferably arranged so as to deliver the fuel in the direction of motion of the air, for example as indicated by broken lines 8 in Fig. 1.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In an internal combustion engine, the combination of a cylinder having a side wall which is a surface of revolution, a passage for the admission of gaseous media provided in the side wall of the cylinder, a valve seat embodied in said passageway, and a valve cooperating with the valve seat and opening toward the cylinder, said valve having its axis arranged in a chordal direction with respect to less than half of the side wall of the cylinder as well as inclined toward one end of the cylinder, and said passageway being so formed as to deflect the gaseous media, when the valve is in open position, circumferentially into the cylinder in an initial direction which is approximately normal to the valve axis and which has a component of direction toward the other end of the cylinder.

2. In an internal combustion engine, the combination of a cylinder having a side wall which is a surface of revolution and a cylinder head, a passage for the admission of gaseous media provided in the side wall of the cylinder, a valve seat embodied in said passageway, and a valve cooperating with said valve seat and opening in a direction toward the cylinder, said valve having its axis arranged in a chordal direction with respect to less than half of the side wall of the cylinder as well as inclined in the direction of the cylinder head and means comprising the wall of said passage and the head of said valve for deflecting the gaseous media, when the valve is in open position, circumferentially into the cylinder in an initial direction which is approximately normal to the valve axis and which has a component of direction away from the cylinder head.

3. In an internal combustion engine, the combination of a cylinder, a passage for the admission of gaseous media being provided in the side wall of said cylinder, a valve seat embodied in said passage, a valve having a head cooperating with said valve seat and disposed with its axis at small angle to the radius at the intersection of said axis and the cylinder, the width of the passage from the valve seat to the cylinder being substantially equal to the width of the valve head, said passage extending in the direction of the valve axis so that the side of the passage nearer the cylinder axis is shorter than the opposite side, the valve head opening toward the interior of the cylinder to the end of the longer side of said passage, in which position the longer side and the valve head deflect the gaseous media through the passageway formed between the shorter side and the valve head in a direction tangentially of the cylinder and from the longer side to the shorter side.

4. In an internal combustion engine, the combination of a working cylinder having a side wall which is a surface of revolution; a passage for the admission of gaseous media provided in the side wall of the cylinder; at least that portion of the passage which is adjacent the side wall being arranged with its axis extending in a chordal direction with respect to less than half of the side wall of the cylinder so that the side of the passage adjacent the cylinder axis is shorter than the side remote from the cylinder axis; a valve seat embodied in the pasageway; a poppet valve cooperating with the seat, and so arranged that its axis is substantially parallel to the axis of the passage; the valve being movable inwardly toward the cylinder to its open position where at the edge portion of the valve adjacent the shorter side of the passage defines with the edge of the passage an opening for the passage of gaseous media, and the edge portion of the valve adjacent the longer side of the passage cooperates with the latter side to restrict flow of gaseous media in directions parallel to the axis of the passage whereby such media is forced to flow circumferentially into the cylinder and in an initial direction approximately normal to the valve axis.

5. An internal combustion engine as claimed in claim 4 wherein a recess is provided in the longer side of the passage and adjacent the valve, said recess having an end wall on the cylinder side of the valve which is substantially parallel to the face of the valve, whereby gaseous media flowing through the recess toward the cylinder will be directed across the face of the valve and into the cylinder in a tangential direction.

In testimony whereof, I have hereunto subscribed my name this 23rd day of November, 1928.

RICHARD WILLIAM BAILEY.